US 8,385,418 B2

(12) United States Patent  (10) Patent No.: US 8,385,418 B2
Crawford et al.  (45) Date of Patent: Feb. 26, 2013

(54) DOMINANT MOTION ESTIMATION FOR IMAGE SEQUENCE PROCESSING

(75) Inventors: Andrew Crawford, Bray (IE); Anil Kokaram, Bray (IE); Francis Kelly, Bray (IE); Hugh Denman, Bray (IE); Francois Pitie, Bray (IE)

(73) Assignee: Google Inc., Mountian View, CA (US)

( * ) Notice: Subject to any disclaimer, the term of this patent is extended or adjusted under 35 U.S.C. 154(b) by 1154 days.

(21) Appl. No.: 11/577,779

(22) PCT Filed: Oct. 20, 2005

(86) PCT No.: PCT/IE2005/000117
§ 371 (c)(1),
(2), (4) Date: Jan. 22, 2008

(87) PCT Pub. No.: WO2006/043258
PCT Pub. Date: Apr. 27, 2006

(65) Prior Publication Data
US 2009/0122866 A1 May 14, 2009

(30) Foreign Application Priority Data
Oct. 22, 2004 (GB) .................................. 0423578.4

(51) Int. Cl.
H04N 11/02 (2006.01)
(52) U.S. Cl. .................................................. 375/240.16
(58) Field of Classification Search .......................... None
See application file for complete search history.

(56) References Cited

U.S. PATENT DOCUMENTS
5,384,865 A * 1/1995 Loveridge ..................... 382/262
6,072,905 A * 6/2000 Cucchi et al. ................ 382/236

FOREIGN PATENT DOCUMENTS
EP   0986252 A1 * 3/2000
GB   2307133 A  * 5/1997
GB   2365244 A  * 2/2002
WO   WO 2004/056089 A2 * 7/2004
WO   WO2004/056089 A2   7/2004

OTHER PUBLICATIONS

Kim et al., "Mapping parameter estimation using integral projections and segmented moving objects in object-oriented analysis-synthesis coding"; Optical Engineering 35(1), p. 156-165 (Jan. 1996).*
Sauer et al., "Efficient Block Motion Estimation Using Integral Projections"; IEEE Transactions on Circuits and Systems for Video Technology, vol. 6, No. 5, Oct. 1996, p. 513-518.*

(Continued)

Primary Examiner — Sath V Perungavoor
Assistant Examiner — Christopher Findley
(74) Attorney, Agent, or Firm — Young Basile Hanlon & MacFarlane P.C.

(57) ABSTRACT

Herein is described a method of estimating dominant motion between a current frame n and another frame m of an image sequence having a plurality of frames, the method comprising generating integral projections of the images and using gradients of those projections and using differences between the projections. The input may be any sequence of image frames from an image source, such as a video camera, an IR or X-ray imagery, radar, or from a storage medium such as computer disk memory, video tape or a computer graphics generator.

20 Claims, 1 Drawing Sheet

OTHER PUBLICATIONS

Dufaux et al., "Efficient, Robust, and Fast Global Motion Estimation for Video Coding"; IEEE Transactions on Image Processing, vol. 9, No. 3, Mar. 2000, p. 497-501.*
A.J Crawford, et al. "Gradient based dominant motion estimation with integral projections for real time video stabilisation", 2004 International Conference of Image Processing (ICIP) Oct. 24-27, 2004 vol. 5 pp. 3371-3374.
Dirk Robinson, et al. "Fast Local and Global Projection-Based Methods for Affine Motion Estimation", Journal of Mathmatical Imaging Vision 18: pp. 35-54, 2003.
Ken Sauer, et al. "Efficient Block Motion Estimation Using Intergral Projections" IEEE Transactions on Circuits and Systems for Video Technologoy, vol. 6, No. 5, Oct. 5, 1996, pp. 513-518.
Peyman Milanfar, "A Model of the Effect of Image Motion in the Radon Transform Domain" IEEE Transactions on Image Processing, vol. 8, No. 9, Sep. 1999, pp. 1276-1281.
Joon-Seek Kim, et al. "Mapping parameter estimation using intergral projections and segmented moving objects in object-oriented analysis-synthesis coding", Optical Engineering Jan. 1996, vol. 35 No. 1, pp. 156-165.
Joon-Seek Kim, et al. "A Fast Feature-Based Block Matching Algorithm Using Integral Projections" IEEE Journal on Selected Areas in Communications, vol. 10, No. 5, Jun. 1992 pp. 968-971.
Patrick Bouthemy, et al. "A Unified Approach to Shot Change Detection and Camera Motion Characterization" IEEE Transactions on Circuits and Systems for Video Technology, vol. 9, No. 7, Oct. 1999, pp. 1030-1044.
J.M. Odobez, et al. "Robust Multiresolution Estimation of Parametric Motion Models" Journal of Visual Communication and Image Representation vol. 6 No. 4, Dec. 1995, pp. 348-365.
Frédéric Dufaux, et al. "Efficient, Robust, and Fast Global Motion Estimation for Video Coding" IEEE Transactions on Image Processing, vol. 9, No. 3, Mar. 2000, pp. 497-501.
A. Kokoram and P. Delacourt. A new global estimation algorithm and its application to retrieval in sports events. In IEEE International Workshop on Multimedia Signal Processing, MMSP '01, pp. 3-5, Oct. 2001.
P. Bouthemy, M. Gelgon, and F. Ganansia. A unified approach to shot change detection and camera motion characterization. IEEE Transactions on Circuits and Systems for Video Technology, 9:1030-1044, 1999.
F. Dufaux and J. Konrad. Efficient, robust and fast global motion estimation for video coding. IEEE Transactions on Image Processing, 9:497-501, 2000.
A. Kokaram, R. Dahoyt, F. Pitie, and H. Denman. Simultaneous luminance and position stabilization for film and video. In Visual Communications and Image Processing, San Jose, California USA, Jan. 2003.
J. H. Lee and J. B. Ra. Block Motion estimation based on selective integral projections. In IEEE ICIP, vol. I, pp. 689-693, 2002.
P. Milanfar. A model of the effect of image motion in the radon transform domain. IEEE Trans. on Image Processing, 8 (9):1276-1281, 1999.
J-M. Odobez and P. Bouthemy. Robust multiresolution estimation of parametric motion models. Journal of visual communication and image representation, 6:348-365, 1995.
Dirk Robinson and Peyman Milanfar. Fast local and global projection-based methods for affine motion estimation. Journal of Mathematical Imaging and Vision, 18:35-54, 2003.
P.H.S. Torr. Geometric motion segmentation and model selection. Philosophical Transactions of the Royal Society A, pp. 1321-1340, 1998.
J. Biemond, L. Looijenga, and D.E. Boekee. A pel-recursive Wiener-based displacement estimation algorithm. Signal Processing, 1987.
J.-S. Kim and R.-H. Park. A fast feature-based block matching algorithm using integral projections. IEEE J. Selected Areas in Communications, 10(5):986-971, Jun. 1992.
K. Sauer and B. Schwartz. Efficient block motion estimation using integral projections. IEEE Trans. Circuits and Systems for Video Technology, 6(5):513-518, Oct. 1996.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 2007.
Patent Cooperation Treaty Written Opinion of the International Searching Authority and International Search Report for International Application No. PCT/IE2005/000117 mailed on Apr. 18, 2006.

* cited by examiner

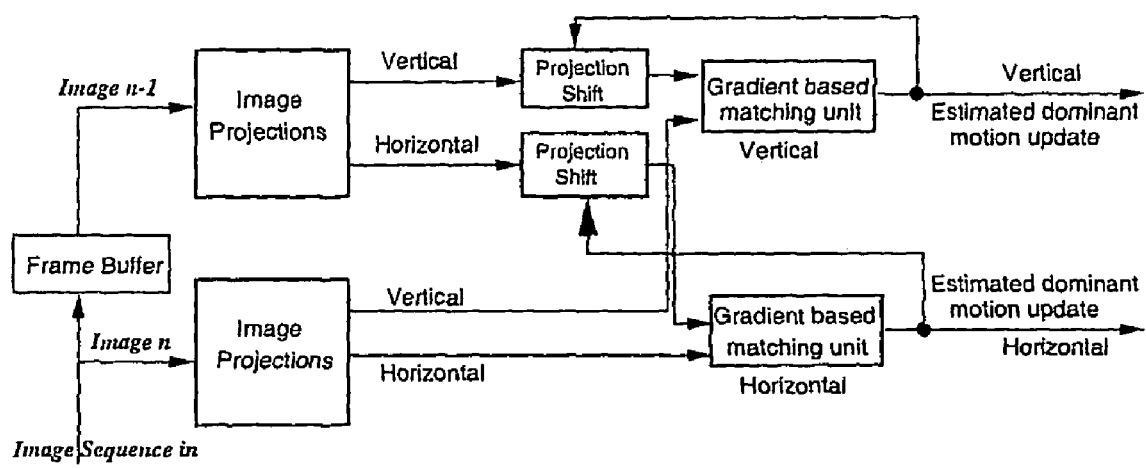

DOMINANT MOTION ESTIMATION FOR IMAGE SEQUENCE PROCESSING

This invention relates to image and video processing and is concerned with measuring the global, dominant or camera motion between any pair of frames in an image sequence. Prior art reveals work in this area for compensating random displacements due to unwanted camera motion, for improving MPEG4 coding and for detecting events in a video stream (e.g. scene cuts). The dominant motion in a scene is that motion component that can be ascribed to most of the picture material in an image. Terms like global motion and camera motion are used synonymously to mean the same thing, but they do not quite express the fact that the dominant motion in a scene can be a combination of both camera behaviour and apparent object behaviour. Thus in an image sequence showing a head and shoulders shot of a person taken with a static camera, the movement of the head is likely to be the dominant motion in the scene as it is the largest moving object. In the recording of a tennis match, any camera motion is the dominant motion since most of the scene content is background (the court) and that background will move relatively with the camera. However, consider that the camera zooms in from a wide view of the court to a close up of the player. The dominant motion is initially the camera zoom, but as the player's body fills the field of view toward the end of the shot, the body motion becomes dominant later on.

Dominant motion information has long been recognised as an important feature in many video processing tasks. This motion embodies information about the video event, hence it is a useful feature for content based retrieval [3]. Similarly, because of the large picture area that can be ascribed to dominant motion, it can (in general) be estimated more robustly than local motion, and is useful for compression as in MPEG4[4].

One embodiment of this invention involves image stabilisation. Image instability manifests as a random, unwanted fluctuation in the dominant motion of a scene. Shake is very common in footage from both hand-held cameras and fixed cameras (despite the image stabilisation technology on most cameras). Instability can be caused by external factors such as wind and unsteadiness in the camera's movement (any instability is magnified at high zoom). Archived video sequences also suffer from unsteadiness introduced during filming or during the digitization of film. As most common compression systems utilise the similarity between consecutive frames, random dominant motion has a large effect on the compressibility of video data since more bandwidth is consumed unnecessarily representing motion locally. Removal of this fluctuation therefore has wide application in a number of different areas.

There are two issues in video stabilisation. Firstly, the dominant motion must be estimated. The unwanted component of this dominant motion must then be extracted and removed, while preserving intentional motion such as pan. To achieve this, it is assumed that the two components of motion have different statistics.

There are many possibilities for estimating dominant motion. These can be split into two main categories: feature based and image based. Feature based methods, typically employed in computer vision, attempt to locate and match important features, e.g. corners in image pairs, and hence extract the image geometry and eventually the perspective distortion [12]. Image based methods rely on direct transformation of the image grid and minimize some image difference criterion. The technique discussed here is an image based method.

Early image based methods include the work described by Dufaux et al [4] (2000) and Odobez et al [9] (1995). These are both very similar and rely on a gradient based approximation to image warping. [9] correctly points out that accurate estimation of dominant motion requires the design of a technique that can suppress the motion of the smaller objects in the scene i.e the Local Motion. Both [9] and [4] propose weighting schemes which are applied to the 2D image plane in order to remove the effect of image motion. These weights are derived from measurements made at single pixel sites only.

As part of video stabilisation systems several prior art publications present mention of global motion estimation. In GB2307133 Video camera image stabilisation system, KENT PHILIP JOHN; SMITH ROBERT WILLIAM MACLAUGHL, 1997 a global rotation measurement is claimed based on using histograms of edge orientations. There is no consideration of translational or general affine treatment. In EP0986252, System and method for electronic image stabilization HANNA KEITH JAMES (US), BURT PETER JEFFREY (US), SARNOFF CORP (US), 2000 a generic claim is made for global motion estimation using a recursive refinement of an initial estimate which may be zero. This concept is well established in prior available literature, also for global motion [9] 1995. Even more generically it is known as an idea for generating motion information since 1987[2]. The present invention presents a new means for creating updates and the updates themselves do not apply to the entire 2D image surface, but instead to extracted measurement vectors. In WO2004056089, FRETWELL PAUL, FAULKNER DAVID ANDREW ALEXANDER (GB) et al, 2004 a claim is made for a method that uses a mask to remove the effect of local motion in estimating global motion. That idea is the same as the weights used by [9], 1995; for the same purpose. However, in [9], the weights are adaptive while in WO2004056089 the weights comprise a fixed, binary mask. Adaptive weights are generally a superior mechanism for coping with global motion, even though more computationally expensive. Finally, in GB2365244, Image stabilisation, LEBBELL MARK (GB); TASKER DAVID (GB), 2002 mention is made about using global motion for video stabilisation but there is no claim regarding the mechanism used for making the global motion measurement.

Direct matching techniques can be attempted for dominant motion estimation. This implies exhaustively searching for the best motion component that would exactly match two image frames. This is known as Block Matching. It is very simple to implement but computationally expensive because of the exhaustive nature of the search process. Since 1992 [5], ad-hoc developments in an alternative strategy for direct matching have emerged. Note that all of these developments have addressed only the problem of discovering the image translation between two images that are identical except for the relative displacement between them. The application domain was not realistic image sequences but instead targeted the image registration problem in satellite imagery. The idea is instead of matching the entire 2D images, it is sensible to match the vertical and horizontal summation of the image. Intuitively it makes sense. Consider that the vertical image projection is the sum of the image intensities along columns. Similarly the horizontal projection is the same along rows. If an image moves upwards, then its horizontal projection also moves upwards. Thus instead of matching an N×M image containing N rows of M columns of digital data, one could just match two vectors containing N and M entries respectively. This is a vast savings in computational cost.

Since 1992, more schemes have emerged that properly recognise the relationship to motion estimation: 1996 [11], 2002 [7]. However these papers all deal with i) direct matching of integral projections using an exhaustive search and ii) no local motion in the blocks. In the former case, computational expense is lower than direct matching of 2D images, but it is still a cost especially for high resolution. In the latter case these papers do not consider the problem of dominant motion estimation.

Milanfar et al [8, 10] have placed some structure on the previously ad-hoc work. They do so by showing that the integral projections approach can be derived from a Radon Transform of the image. Their work leads to unification of previous approaches and the introduction of the idea that projections along non-cartesian directions could be better in some cases. Again this work does not consider local motion as an issue.

1 Estimating Dominant Motion: The Invention

This invention discloses a new means for estimating dominant motion that is more computationally efficient. One embodiment of the invention results in a system using general purpose hardware, that removes random, unwanted global motion at rates in excess of 25 frames per second operating on standard definition 720×576 digital television images. The input may be any sequence of image frames from an image source, such as a video camera, an IR or X-ray imagery, radar, or from a storage medium such as computer disk memory, video tape or a computer graphics generator.

One component of this invention, is a new perspective on Integral Projections which is much simpler to follow than the Transform domain exposition [8]. It is different in that it leads directly to a gradient based approach to matching integral projections. This is computationally cheaper. The gradient based aspect is another component of the invention, along with a refinement process for treating large displacement. In addition, the new result allows a measure to be derived that can check the validity of a projection before motion estimation begins. The invention also incorporates the use of weights in the image space to remove the effect of local motion on the integral projection. Finally, one embodiment of the invention is the use of the Graphics Hardware available in general purpose PCs, PDAs and game consoles (e.g. Sony Playstation) for implementing the projection and compensation unit for an image stabiliser.

An overview of the process is shown in FIG. 1. The FIGURE shows the overall system invention, in an embodiment for translational motion. The frame buffer unit is an image delay that can manifest as a framestore holding one previous frame in memory. The frames input to the system need not be consecutive however. The Image Projections and Projection Shift units create and translate projections respectively. These units may be implemented within the Graphics hardware of modern computers and games consoles. The Gradient Based matching unit calculates the shift between current and previous image frame projections using the method described in this invention.

Dominant motion is estimated based on a single large N×N block centred on each frame. In one embodiment of the invention, a value of N=512 pixels is used for a 720×576 image. This block size is arbitrary and depends on the size of the overall picture. It generally should occupy 90% of the area of the image. All methods described use one dimensional, Integral Projections of this block to estimate global motion. The directions of the projections need not be vertical and horizontal. They may be any set of directions, preferably two orthogonal directions. Consider an integral projection of the image $I_n(h, k)$, where n is the frame index, h, k are pixel coordinates. The horizontal projection is calculated by summing along rows (horizontal direction) and given by $p_n^y(h)=\Sigma_k I_n(h, k)$, while the vertical projection results from summing along columns (vertical direction): $p_n^x(k)=\Sigma_h I_n(h, k)$.

To relate the use of these projections to motion estimation, express the image sequence as obeying the following law $$I_n(x)=I_{n-1}(x+d)+\epsilon(x) \quad (1)$$

where x=[h, k], d is the dominant image displacement and $\epsilon(x)\sim N(0, \sigma_e^2)$ (Gaussian noise). d consists of two components $[d_1, d_2]$, the horizontal and vertical components of motion.

Consider that an initial estimate of d exists. The initial estimate may be zero. Define this to be $d_0$. Further, consider that it is required to update this estimate such that the result is the actual displacement: $d=d_0+u$, where $u=[u_x, u_y]$ is the update displacement vector. Therefore, the image sequence model can be written as $$I_n(x)=I_{n-1}((x+d_0)+u)+\epsilon(x) \quad (2)$$

Using the Taylor Series Expansion to linearize the left hand side about $x+d_0$ gives:

$$I_n(x)=I_{n-1}(x+d_0)+u^T\nabla I_{n-1}(x+d_0)+\epsilon(x) \quad (3)$$

Let $Z_n(x)=I_n(x)-I_{n-1}(x+d_0)$:

$$Z_n(x)=u^T\nabla I_{n-1}(x+d_0)+\epsilon(x) \quad (4)$$

Writing the $\nabla$ operator in full:

$$Z_n(h,k)=u_x G_x(h,k)+u_y G_y(h,k)+\epsilon(h,k) \quad (5)$$

where $G_x(h, k)$, $G_y(h, k)$ are horizontal and vertical gradients at image pixel (h, k) respectively; given as follows.

$$G_y(h, k) = \frac{\partial I_{n-1}(h, k)}{\partial y} \text{ and } G_x(h, k) = \frac{\partial I_{n-1}(h, k)}{\partial x} \quad (6)$$

The crucial step is to recognise that assuming the motion is the same for a large image area, summing in a particular direction can allow useful approximations. To simplify matters assume $\Sigma_h \epsilon(h, k)=0$ although it is possible to proceed without this assumption. Summing horizontally along rows with respect to h:

$$\underbrace{\sum_h Z_n(h, k)}_{(i)} = u_x \underbrace{\sum_h G_x(h, k)}_{(ii)} + u_y \underbrace{\sum_h G_y(h, k)}_{(iii)} \quad (7)$$

A similar expression exists for summing in the vertical direction. If it were possible to ignore one of the two terms (ii) or (iii) each component of motion could be solved separately. The table below shows the ratio $\Sigma_h G_y/\Sigma_h G_x$ for a number of test images which are used as standard in the image processing industry.

| Image | Ratio |
|---|---|
| Lena | 7.1 |
| Sailboat | 24.2 |
| Peppers | 76.9 |

The table shows that term (iii) is more significant than term (ii) in general. This makes sense since summing with respect to h followed by calculating the gradient also with respect to h is equivalent to applying a low-pass filter along the rows followed by a high-pass filter in the same direction. Such a cascade will produce a low energy output. It is sensible then to assume that (ii)=0, which yields the following simplification.

$$\sum_h Z_n(h, k) = u_y \sum_h G_y(h, k) \qquad (8)$$

Defining $z_n^x(k) = \Sigma_h Z_n(h, k)$ and $g_y^x(k) = \Sigma_h G_y(h, k)$, allows this expression at a single row k to be written as follows.

$$z_n^x(k) = u_y g_y^x(k) \qquad (9)$$

Each such equation at each row can be stacked into a vector to yield a set of equations as follows.

$$\begin{bmatrix} z_n^x(0) \\ z_n^x(0) \\ z_n^x(0) \\ \vdots \\ z_n^x(N-1) \end{bmatrix} = u_y \begin{bmatrix} g_y^x(0) \\ g_y^x(0) \\ g_y^x(0) \\ \vdots \\ g_y^x(N-1) \end{bmatrix} \qquad (10)$$

where there are N rows in the block being analysed. This equation can be represented in vector form as $$z_n^x = u_y g_y^z \qquad (11)$$

Using the pseudoinverse, an estimate for $u_y$ can then be generated as using the following expression.

$$u_y = \frac{g_y^{xT} z_n^x}{g_y^{xT} z_y^x} \qquad (12)$$

At this point it is vital to recognise that the elements of vectors $z_n$ and $g_y$ can be calculated using integral projections.

$$z_n^x(k) = p_n^x(k) - p_{n-1}^x(k) \qquad (13)$$

$$g_y^x(k) = p_{n-1}^x(k) - p_{-1}^x(k-1) \qquad (14)$$

Thus $u_y$ can be calculated using integral projections. $u_x$ can be calculated similarly, summing along rows k. Hence the connection between Integral projections and motion estimation.

In addition, for any transformation of the image that can be effectively linearized by the Taylor series expansion, this idea holds. Consider that the dominant motion is due to an affine transformation given by a 2D matrix A, as follows.

$$A = \begin{bmatrix} a_{11} & a_{12} \\ a_{21} & a_{22} \end{bmatrix} \qquad (15)$$

Affine motion generalises zoom, rotation, and skew transformations of the image. For instance $a_{11} = a_{22} = 0.5$; $a_{12} = a21 = 0$ causes a zoom of factor two between images. Assuming translational motion as well, the image model can therefore be written as $$I_n(x) = I_{n-1}(Ax + d) + \epsilon(x) \qquad (16)$$
$$= I_{n-1}(a_{11}h + a_{12}k + d_1, a_{21}h + a_{22}k + d_2) + \epsilon(h, k)$$

Again, the Taylor series expansion can be used to expand the expression above about an initial estimate. However the initial motion estimate is now $A_0$, $d_0$, since both affine motion and translational must be accounted for. Exactly the same steps as above can then be followed, including summing along particular directions to yield a solution for the parameters A, d. In this formulation however it is not possible to straightforwardly separate estimation of each parameter into separate equations even after summation along the projection directions. Nevertheless summation does yield simplification and again a projection based motion estimate results.

1.1 A Test

It is possible to use projection directions which are not vertical or horizontal. In fact this is advantageous in order to increase the validity of the crucial assumption in equation 8. To validate a particular projection direction, the term $\Sigma_h G_k / \Sigma_h G_h$ can be measured. If this value is too low, another projection angle should be used. This ratio can also be used as a prior step before motion estimation to decide on suitable projection directions.

1.2 Multiresolution Refinement Step

The Taylor series expansion holds only for small values of dominant motion. This problem can be circumvented by using multiresolution techniques. Coarse to fine refinement of motion estimates on a pyramid of images is one mechanism for dealing with large displacement in the gradient estimation context. Here a 4 level pyramid is employed with a maximum of 10 iterations at each level. The method is called Multi-Res in subsequent sections. A further computational savings is had by noting that the pyramid can be generated in the 1D projection space rather than in the 2D image space. Thus the pyramid is built by downsampling 1D projections rather than projecting downsampled images. The savings is on the order of $N^2/3$ multiply adds.

Because the manipulation of integral projections requires so little computation, it is possible to propose another, hybrid technique. Direct matching on the projections using for example cross correlation is performed, at the integer pixel resolution. This leads to an estimate $d_0$. The resulting estimate of motion is then used to initialise the gradient based estimator above. This method allows the gradient based method to concentrate on the relatively small motion adjustments required after the gross direct matching is achieved.

1.3 Weights

Weights can be used to reduce the effect of objects undergoing local motion on the estimation of global motion. Weighting can be done either in the projections themselves or in the 2D image space. The idea of weighted estimation for this purpose can be found in [9]. This invention applies that idea for use with the projections based, gradient technique given here.

Applied to the image space, a weight w(h, k) representing a confidence between 0 and 1 can be associated with each pixel site. Each weight can be derived as a function of the observed displaced frame difference (DFD) $\epsilon(x) = I_n(x) - I_{n-1}(x+d)$ at that site at each iteration. Note that the DFD is measured by warping the 2D image $I_{n-1}$ with the current estimate of global motion and subtracting that from the current image $I_n$. Large DFD is mapped to low weights and vice versa. One possibility for mapping DFD to weights is the function $w(h, k)=2/(1+\exp(\alpha\epsilon(h, k)))$ where $\alpha$ adjusts how fast the weights go to 0 as Z gets larger. Many other functions can be used, the essential idea being that large DFD probably indicates a poor image match, hence residual motion, hence local motion. These weights are then used to remove the effect of the corresponding pixels in the integral projections by premultiplying the image with the weights before summation. Each projection element must be scaled by the sum of the weights along the relevant row or column.

In a similar fashion, weights can be applied directly in the projections space by applying them to modulate gradients and z. Thus a weight is associated with each projection bin by using the same means as mentioned previously except the error measure (DFD) is the difference between current and previous projections (displaced by current motion estimates). Both the gradient and difference vector are multiplied by the weights before a solution is generated for the global motion. This results in a matching process robust to large deviations in the projections space presumably caused by local motion.

1.4 Real Time Implementation and Computation

The video frame-rate must be maintained for a real-time implementation. To achieve real-time implementation at this PAL frame rate (25 fps), each frame must be processed in less than 40 ms.

The table below compares the computational complexity of block matching with that of each of the methods proposed as embodiments of the invention. The first column gives the number of operations required based on a single N×N size block, with a range of (+/−w) (where i is the number of iterations and t is the number of taps used in the low pass filter used by the multi resolution method). This does not include the number of computations required to calculate the projections ($2N^2$). The ratio of computations w.r.t. block matching is also shown (including the calculation of the projections) given values of N=512, w=32, i=20 and t=15. A value of ratio less than 1 indicates that the algorithm contains proportionately less operations than BM. It is clear from these values the use of integral projections provides a huge reduction in computational complexity.

| Method | Operations | Ratio to BM |
| --- | --- | --- |
| BM | $(2w + 1)^2(N^2)$ | 1 |
| Gradient based | $2i(7N)$ | 0.00060 |
| Hybrid | $8wN + 8N + 14iN$ | 0.00073 |
| Multi-Res | $1\frac{15}{16}N(t + 14i)$ | 0.00074 |

1.4.1 Separating Unwanted Components of Motion

Global motion can be caused by: (1) intentional effects like a pan, and (2) the unsteadiness of the camera which is unintentional. The first effect is generally low frequency and exhibits slow temporal variations, whereas the secondary effect could be temporally impulsive. In the case of image sequence stabilisation, after the dominant motion estimation step the measured motion is a combination of unwanted and wanted components. For instance, if a person is holding a camera and pans from left to right, a shaking hand will cause the deviation of the global motion away from the desired pan motion due to the (perhaps) random hand movements. The random hand motion component is unwanted while the pan is desired. The dominant motion estimator will yield a motion estimate that is the sum of these two motions. Thus removing all dominant motion in this case does stabilise the sequence but it also removes the desired pan.

In one embodiment of the invention, the dominant motion estimator can be coupled with a process for removing unwanted components of motion. It is possible to extract the low frequency (desired) signal by means of a low pass filter [6]. The motion estimate that is required for stabilisation can then be found by simple difference of the output of this filter and the measured motion.

As the shake in hand-held cameras is not extreme and only past estimations are available in a real time system, a simple IIR low pass filter is sufficient where the coefficients of the filter could manifest follows.

$$H(z) = \frac{0.0201 + 0.0402z^{-1} + 0.2017z^{-2}}{1 + 1.561z^{-1} - 0.6414z^{-2}} \quad (17)$$

In another situation, the unintentional motion could last for a single frame or be completely random. This is the case in film scanning when frames are displaced randomly from each other because of scanner malfunction or the degradation of the film guide holes. In this situation the filter above cannot reject the impulsive, random component on its own especially when that component is large. A solution is to use a median filter as a detector of large deviations in global motion. Thus the motion estimates are first filtered with a median filter (having at least 3 taps, and preferably 5 taps). This will reject large deviations in the observed global motion. The difference between that median filtered output and the original motion signature will be large at the instances of large impulsive deviation, but small otherwise. By thresholding this difference signal, it is possible to switch between the IIR filter output and the median filter output. Thus the desired component of motion can be estimated regardless of the size and randomness of the global motion.

Finally, it is noted that when there are changes in the average brightness of the image, the iterative refinement global motion estimate process described above may not converge well. This problem can occur during scene change effects like fades, or if there is degradation of the image leading to brightness fluctuations. This lack of convergence can occur because changes in brightness can cause a fixed offset in z which in turn ensures that the update motion u may not ever become zero. To alleviate this problem it is preferable to normalise the projections to have the same mean and variance before proceeding with the matching step.

1.4.2 Event Spotting

The ability to automatically spot an important event in a video sequence is useful for surveillance and summarisation applications. In sports for instance, a rapid zoom in could indicate an important object is in view. In cricket, a zoom in followed by a zoom out indicates a bowler run up and delivery sequence [1]. In addition, large apparent translations could indicate people entering or leaving a room. For this reason the dominant motion estimation process described here can be used for event spotting since it yields a feature that could be correlated to important events in the video.

1.5 Image Compensation and the GPU

To create the final images for output, each image must be shifted to compensate for the unwanted motion component estimated in previous sections. In order to accurately represent the global motion of a frame, a sub-pixel accurate motion vector is typically required. Interpolation of the image signal is required to motion compensate a frame with a fractional motion vector. Typically bilinear interpolation is sufficient.

However this interpolation is computationally very demanding and can be a bottleneck in a real-time shake reduction scheme.

Modern graphics hardware contain very efficient interpolation units which are used in the texture mapping stage of the graphics pipeline. The graphics hardware can compensate each frame with bilinear interpolation accuracy. This can be done much faster than real-time with the motion compensated sequence displayed on screen. Each motion compensated frame can also be retrieved from the graphics hardware and saved to file if necessary. Because the graphics hardware can work in parallel with the CPU, using it for motion compensation also frees up valuable CPU cycles for other processes. We do not present here the details of the GPU code needed to achieve this. This code will change with generations of GPUs. The point to be made here is that it is one embodiment of this invention that the interpolation unit of the GPU can be used as part of the pipeline for dominant motion estimation and subsequent video stabilisation as required. GPUs produced by NVIDIA™ and ATI™ are good vehicles for this implementation. The Sony Playstation™ is also suitable.

In addition, dedicated hardware can be built to perform these functions including a combination of FPGA and DSP blocks.

REFERENCES

[1] A. Kokaram and P. Delacourt. A new global estimation algorithm and its application to retrieval in sport events. In *IEEE International Workshop on Multimedia Signal Processing*, MMSP'01, pages 3-5, October 2001.

[2] J. Biemond, L. Looijenga, and D. E. Boekee. A pel-recursive Wiener-based displacement estimation algorithm. *Signal Processing*, 1987.

[3] P Bouthémy, M. Gelgon, and F. Ganansia. A unified approach to shot change detection and camera motion characterization. *IEEE Transactions on Circuits and Systems for Video Technology*, 9:1030-1044, 1999.

[4] F. Dufaux and J. Konrad. Efficient, robust and fast global motion estimation for video coding. *IEEE Transactions on Image Processing*, 9:497-501, 2000.

[5] J.-S. Kim and R.-H. Park. A fast feature-based block matching algorithm using integral projections. *IEEE J. Selected Areas in Communications*, 10(5):986-971, June 1992.

[6] A. Kokaram, R. Dahyot, F. Pitié, and H. Denman. Simultaneous luminance and position stabilization for film and video. In *Visual Communications and Image Processing*, San Jose, Calif. USA, January 2003.

[7] J. H. Lee and J. B. Ra. Block motion estimation based on selective integral projections. In *IEEE ICIP*, volume I, pages 689-693, 2002.

[8] P. Milanfar. A model of the effect of image motion in the radon transform domain. *IEEE Trans. on Image Processing*, 8(9): 1276-1281, 1999.

[9] J-M. Odobez and P. Bouthémy. Robust multiresolution estimation of parametric motion models. *Journal of visual communication and image representation*, 6:348-365, 1995.

[10] Dirk Robinson and Peyman Milanfar. Fast local and global projection-based methods for affine motion estimation. *Journal of Mathematical Imaging and Vision*, 18:35-54, 2003.

[11] K. Sauer and B. Schwartz. Efficient block motion estimation using integral projections. *IEEE Trans. Circuits and Systems for Video Technology*, 6(5):513-518, October 1996.

[12] P. H. S. Torr. Geometric motion segmentation and model selection. *Philosophical Transactions of the Royal Society A*, pages 1321-1340, 1998.

The invention claimed is:

1. A method of estimating dominant motion between a current frame n and another frame m of an image sequence having a plurality of frames, each of the frames having a plurality of pixels, the method comprising:
generating integral projections of the current frame n and the other frame m;
normalizing the integral projections for mean; and
estimating dominant motion with a processor by using gradients of the normalized integral projections and using differences between the normalized integral projections, the dominant motion being a motion associated with most of the pixels of current frame n.

2. A method according to claim 1, wherein the dominant motion is estimated for a coarse version of the current frame n and other frame m and the dominant motion estimate is successively refined at successively higher frame resolutions of the current frame n and other frame m.

3. A method according to claim 2, wherein the dominant motion is estimated by direct matching of the integral projections and the dominant motion estimate is then refined using gradients of the integral projections.

4. A method according to claim 3, wherein the dominant motion being estimated is translational only.

5. A method according to claim 3, wherein the dominant motion being estimated is translational and affine only.

6. A method according to claim 3, wherein a test is applied to validate an effectiveness of one or more projection angles of the integral projections before starting the direct matching.

7. A method according to claim 6, wherein different projection angles are used if the test fails at a particular angle.

8. A method according to claim 1, further comprising:
stabilising a video sequence using the dominant motion estimate.

9. A method according to claim 1, further comprising:
spotting an event in an image sequence using the dominant motion estimate.

10. A method according to claim 1, further comprising:
spotting an event in a sports broadcast or image sequence containing sport using the dominant motion estimate.

11. A method according to claim 1, wherein the generation of the integral projections uses a Graphics Processing Unit.

12. A method according to claim 1, further comprising:
applying a weight to of at least one of pixels of the current frame n or the other frame n or to the integral projections to suppress an effect of local motion.

13. A method according to claim 8 removing unwanted motion components from the estimated dominant motion using an IIR filter.

14. A method according to claim 1 in which the integral projections of each of the current frame n and other frame m are generated over a single sub-block that occupies a substantively large portion of each respective frame.

15. A method according to claim 1 in which the integral projections of each of the current frame n and other frame m are generated over a single sub-block of each respective frame that occupies a region of 512×512 pixels, wherein each of the current frame n and other frame n have a frame resolution of 720×576 pixels.

16. A method according to claim 4, wherein the dominant motion estimates for the coarse version of the current frame n and other frame m and successive refinements at successively higher frame resolutions of the current frame n and other frame m are estimated and refined using a coarse version of the generated integral projection and successively higher resolution versions of the generated integral projections, wherein the coarse version and successively higher resolution versions are created by filtering the generated integral projections.

17. A method according to claim 1, further comprising:
estimating desired components of the dominant motion estimate using a combination of an IIR filter and a median filter.

18. A method according to claim 1, further comprising:
normalizing the integral projections for variance before estimating the dominant motion.

19. A method for estimating dominant motion in a sequence of at least two images, the method comprising:
refining an original estimate of the dominant motion by a correction estimated by determining gradients and differences of integral projections of the at least two images using a processor, wherein the integral projections are normalized for mean.

20. A method of estimating dominant motion which requires at least one refinement of an initial estimate, the method comprising:
calculating the refinement with a processor using a product of a gradient of a projection of an image in a current frame with a difference between two projections in the current frame and another frame, divided by an energy of a projection gradient in the current frame.

* * * * *